United States Patent
Hernandez Londono

(10) Patent No.: US 10,896,333 B2
(45) Date of Patent: Jan. 19, 2021

(54) METHOD AND DEVICE FOR AIDING THE NAVIGATION OF A VEHICLE

(71) Applicant: SAFRAN, Paris (FR)

(72) Inventor: Jorge Eduardo Hernandez Londono, Moissy-Cramayel (FR)

(73) Assignee: SAFRAN, Paris (FR)

( * ) Notice: Subject to any disclaimer, the term of this patent is extended or adjusted under 35 U.S.C. 154(b) by 37 days.

(21) Appl. No.: 16/318,755

(22) PCT Filed: Jul. 18, 2017

(86) PCT No.: PCT/FR2017/051957
§ 371 (c)(1),
(2) Date: Jan. 18, 2019

(87) PCT Pub. No.: WO2018/015654
PCT Pub. Date: Jan. 25, 2018

(65) Prior Publication Data
US 2019/0286918 A1    Sep. 19, 2019

(30) Foreign Application Priority Data

Jul. 19, 2016  (FR) ...................................... 16 56870

(51) Int. Cl.
*G06K 9/00* (2006.01)
*G06T 7/55* (2017.01)
*G06K 9/03* (2006.01)
*G06K 9/62* (2006.01)

(52) U.S. Cl.
CPC ......... *G06K 9/00791* (2013.01); *G06K 9/036* (2013.01); *G06K 9/6262* (2013.01); *G06T 7/55* (2017.01); *G06T 2207/30252* (2013.01)

(58) Field of Classification Search
CPC .. G06K 9/00791; G06K 9/036; G06K 9/6262; G06T 2207/30252; G06T 7/55
See application file for complete search history.

(56) References Cited

PUBLICATIONS

International Search Report dated Oct. 20, 2017, in PCT/FR2017/051957, filed Jul. 18, 2017.
(Continued)

*Primary Examiner* — Farzana Hossain
(74) *Attorney, Agent, or Firm* — Oblon, McClelland, Maier & Neustadt, L.L.P.

(57) ABSTRACT

The method of assisting driving a vehicle includes constructing a digital model defining a quality index for a 3D inference image derived from an original image, the index being a function of similarity metrics defined between the original image and the 3D inference image, the construction making use of a set of observations obtained from reference 3D inference images resulting from applying 3D inference methods to a plurality of reference original images, these observations including measured values for 3D information represented on the reference 3D inference images; acquiring a first image of a three-dimensional scene that might have an influence on the driving of the vehicle; generating a 3D inference second image from the first image; estimating similarity metrics between the first and second images; evaluating the quality index for the second image by using the digital model and the estimated similarity metrics; and as a function of the quality index as estimated, a step of using the second image to assist driving the vehicle.

10 Claims, 2 Drawing Sheets

(56) References Cited

PUBLICATIONS

Karsch, K. et al. "Depth Extraction from Video Using Non-parametric Sampling", Computer Vision ECCV 2012, XP047019065, 2012, pp. 775-788.
Lavoue, G. et al., "On the Efficiency of Image Metrics for Evaluating the Visual Quality of 3D Models", IEEE Transactions on Visualization and Computer Graphics, vol. 22, No. 8, XP011615445, Aug. 2016, pp. 1987-1999.
Huang, W. et al., "Toward Naturalistic 2D-to-3D Conversion", IEEE Transactions on Image Processing, vol. 24, No. 2, XP011570187, Feb. 2015, pp. 724-733.

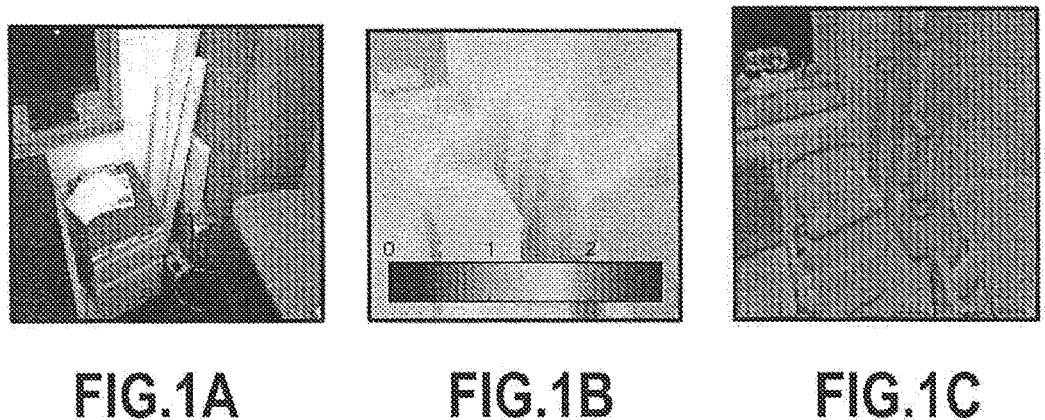
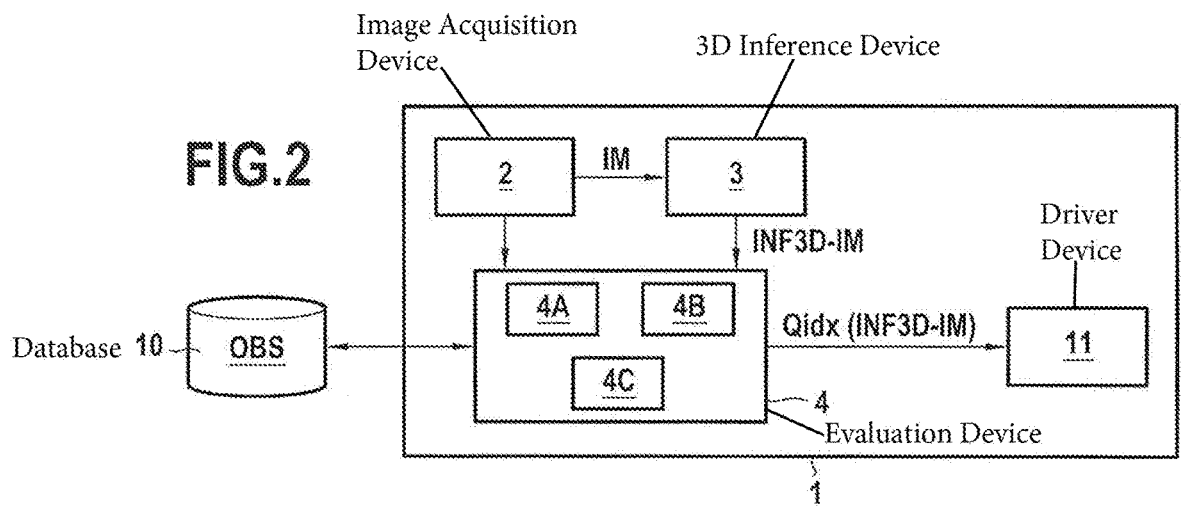
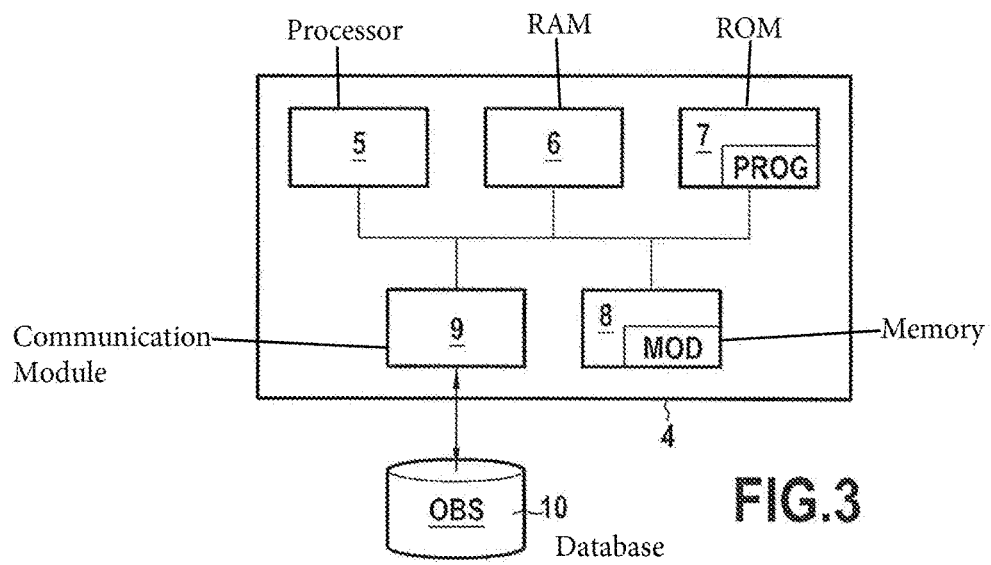

METHOD AND DEVICE FOR AIDING THE NAVIGATION OF A VEHICLE

BACKGROUND OF THE INVENTION

The invention relates to the general field of assisting driving a vehicle, e.g. an aerial vehicle or a land vehicle.

The invention relates more particularly to a method and to a system for assisting driving by using color images of a three-dimensional scene together with images that result from applying a three-dimensional (3D) inference method to those images.

In known manner, 3D perception of a three-dimensional scene presents information that is very important for driving systems or for driving assistance systems. This perception is generally obtained by using 3D acquisition systems: laser rangefinder; motion picture camera or stereo camera; etc.

Nevertheless, depending on the environment, it is not always simple to access systems of that type. Furthermore, the use of monocular systems such as mono-cameras on board vehicles or on separate pieces of equipment (e.g. smartphones) is becoming more and more widespread.

The purpose of 3D inference is to use "original" images as acquired by a mono camera or an equivalent acquisition system in order to estimate the 3D information contained in those images. For this purpose, and by way of example, various existing 3D inference methods may make use of geometrical and/or semantic indices relating to the lighting or to the video (occlusion, movement, etc.), etc., as contained in the original image, and making it possible to extract depth information about the scene shown in the image and about the objects making it up. The 3D information generated by those methods can take various forms:
- either it is represented in the form of a depth map, generally using different color codes representing the depths of different surfaces of objects making up the scene;
- or else it is represented in the form of an orientation map, generally using different color codes representing the orientations of the vectors normal to the various surfaces of the objects making up the scene.

By way of illustration, for an original image as shown in FIG. 1A, FIGS. 1B and 1C show respectively an example depth map and an example orientation map as obtained from that original image by using a 3D inference method.

Nowadays, three major categories of 3D inference methods can be distinguished, namely:
- methods based on geometrical and volume constraints: these methods extract lines and planes approximating certain surfaces in the scene by means of parallelepiped or more generally by known 3D shapes. By way of example, one such method is described in the document by Delage et al. entitled "Automatic Single-Image 3D Reconstructions of Indoor Manhattan World Scenes", 2005;
- methods based on semantic analyses: these methods rely on detecting and/or estimating semantic representations in the scene enabling depths to be allocated. By way of example, such representations are "the wall is vertical", "the ground is horizontal", "the sky is at infinity", etc. In particular, one example of such a method is described in the document by Hoiem et al. entitled "Seeing the World Behind the Images: Spatial Layout For 3D Scene Understanding", 2005-2007; and
- methods by training: these methods use databases containing a plurality of (image, depth) pairs in order to determine parameters and/or define a model or an architecture, thereby learning directly the relationships that exist between the original image and the 3D information that it contains. By way of example, one such method is described in the document by Karsch et al. entitled "Depth Transfer: Depth Extraction from Video Using Non-parametric Sampling", 2014.

Naturally, the purpose of those three categories of method is to provide images that are representative of the 3D information contained in visually correct original images so that they can be used by driving systems. Nowadays, it is 3D inference methods by training that are the methods enabling the best results to be achieved, i.e. that provide the best quality 3D inference images. In the description below, the term "3D inference image" is used to designate the image representing the 3D information contained in an original image by applying a 3D inference method. No limitation is associated with the form taken by this image (image representing a depth map or an orientation map).

In order to determine the quality of a 3D inference image, it is possible to compare the data contained in the 3D inference image with "terrain truth", in other words with depth measurements taken on the real scene. Various quality indices can be defined from such measurements. Which index to select in comparison with another for estimating the quality of a 3D inference image may be guided in particular by the form of the 3D information shown in the 3D inference image, i.e. whether the 3D inference image shows a depth map or an orientation map of the original image. In nonexhaustive manner, mention may be made by way of example of the following quality indices:
- for a 3D inference image showing a depth map:
  - a mean relative depth error, evaluated over the entire 3D inference image and based on an L-1 norm (norm defined from an absolute value) and given by:

$$\frac{1}{N}\sum_{p=1}^{N}\frac{|d_p - d_p^*|}{d_p^*}$$

where N designates the number of pixels in the 3D inference image, $d_p$ designates the depth associated with the pixel p in the 3D inference image, and $d^*_p$ designates the depth measured on the terrain corresponding to the pixel p;
  - a mean relative depth error based on an L-2 norm (squared norm) and given by:

$$\frac{1}{N}\sum_{p=1}^{N}\frac{(d_p - d_p^*)^2}{d_p^*}$$

- for a 3D inference image representing an orientation map:
  - a mean angle difference (or error) given by:

$$\frac{1}{N}\sum_{p=1}^{N}\theta_p$$

where $\theta_p$ designates the angle between the vector that is normal to the pixel p of the 3D inference image and the normal vector as measured on the scene and corresponding to that pixel;

an angle difference (or error) given by the median of the set constituted by the angles $\theta_p$, $p=1, \ldots, N$. It should be recalled that the median of a set of values is a statistical value representing the value that splits the set values into two subsets of the same size.

Knowledge of such quality indices is precious for driving systems that use 3D inference images, since they can judge the pertinence of using or not using those inference images to assist driving. Nevertheless, those "terrain" measurements that are used as references and that are needed in order to evaluate the above-mentioned quality indices are unfortunately not always available.

OBJECT AND SUMMARY OF THE INVENTION

The present invention serves in particular to mitigate the above-specified drawback by proposing a method of assisting driving a vehicle, the method comprising:
- a construction step for constructing a digital model defining a quality index for a 3D inference image resulting from applying a 3D inference method to an original image as a function of a plurality of similarity metrics defined between the original image and the 3D inference image, said construction step using a set of observations obtained for a plurality of reference 3D inference images resulting from applying at least one 3D inference method to a plurality of reference original images, said observations comprising measured values for 3D information represented on the reference 3D inference images;
- an acquisition step for acquiring a first image of a three-dimensional scene that might have an influence on the driving of the vehicle;
- a generation step for using the first image to generate a second 3D inference image by applying a 3D inference method to the first image;
- an estimation step for estimating said plurality of similarity metrics between said first image and said second 3D inference image;
- an evaluation step for evaluating the quality index of the second 3D inference image by using the digital model and said plurality of estimated similarity metrics; and
- if the estimated quality index is greater than a predetermined reference threshold, a utilization step for using the second 3D inference image to assist driving the vehicle; and wherein the step of constructing the digital model comprises:
- an evaluation step for evaluating, for each of the observations:
  - the quality index defined by the digital model by using the pixel values of the reference 3D inference images and the measured values of the 3D information represented by those pixels; and
  - the plurality of similarity metrics by using the pixel values of the reference 3D inference images and the pixel values of the corresponding reference original images; and
- a determination step for determining the digital model by applying a regression technique to the quality indices and the similarity metrics evaluated during the evaluation step.

Correspondingly, the invention also provides an assistance system for assisting driving a vehicle, the system comprising:
- a construction device for constructing a digital model defining a quality index for a "3D inference" image resulting from applying a 3D inference method to an original image as a function of a plurality of similarity metrics defined between the original image and its 3D inference image, said construction device being configured to use a set of observations obtained for a plurality of reference 3D inference images resulting from applying at least one 3D inference method to a plurality of reference original images, said observations comprising measured values for 3D information represented on the reference 3D inference images, and said construction device for constructing the digital model also being configured to evaluate, for each of the observations:
  - the quality index defined by the digital model by using the pixel values of the reference 3D inference images and the measured values of the 3D information represented by those pixels; and
  - the plurality of similarity metrics by using the pixel values of the reference 3D inference images and the pixel values of the corresponding reference original images;
and to determine the digital model by applying a regression technique to the quality indices and the evaluated similarity metrics;
- an acquisition device for acquiring a first image of a three-dimensional scene that might have an influence on the driving of the vehicle;
- a generation device for using the first image to generate a second 3D inference image by applying a 3D inference method to the first image; and
- an evaluation device for evaluating the quality of the second 3D inference image, the evaluation device comprising:
  - an estimation module for estimating said plurality of similarity metrics between said first image and said second 3D inference image; and
  - an evaluation module of evaluating the quality index of the second 3D inference image by using the digital model and said plurality of estimated similarity metrics;

the system for assisting driving the vehicle being configured to use the second 3D inference image if the estimated quality index is greater than a predetermined reference threshold.

By way of example, the assistance system is configured to cause the vehicle to avoid obstacles and/or collisions.

Thus, the invention proposes a novel quality index giving a good estimate of the quality of the 3D inference image (the "second" image in the meaning of the invention) as generated from an original image (the "first" image in the meaning of the invention). This quality index is advantageously estimated on the basis of a pre-established digital model taking account of real observations of 3D information (measurements required on the terrain), and that defines the quality index as a function of a plurality of similarity measurements calculated between the original image and the corresponding 3D inference image. Once the model has been constructed, it is advantageously possible to ignore knowledge of terrain measurements for estimating the quality of the 3D inference image.

The digital model can be constructed easily on the basis of real ("terrain") measurements available for the reference images. Such measurements are easily accessible; by way of example, databases are available to the public that can be used for training (i.e. constructing) the digital model. By way of example, such databases are the known databases: Make3D, MSR-V3D, KITTI, NYUDepth v1 and v2, etc. In particular, they contain measurements required using depth sensors such as Kinect sensors or lasers for various indoor and/or outdoor scenes.

For constructing the digital model, it should be observed that the invention advantageously makes use of observations acquired for different 3D inference methods, thus making it possible to make more efficient use of the accessible data and of its density.

The invention has a preferred application when the estimated quality of the 3D inference image needs to be supplied in real time. This applies typically when assisting driving, in which the images are acquired in real time and a decision about whether or not to take these images into account needs to be available quickly in order for the assistance to be useful and pertinent for the end user. The reference threshold taken into consideration in the invention is selected in such a manner as to set aside 3D inference images that are of quality that is insufficient for assisting driving the vehicle.

Furthermore, taking a plurality of similarity measurements into account makes it possible to define a quality index that is pertinent for different 3D inference methods. For this purpose, while constructing the digital model, it suffices to take account of similarity measurements that are pertinent for a wide variety of methods. Specifically, depending on the category to which 3D inference methods belong, they are likely to present responses that are substantially different. By taking account of a "composite" index constructed from various different similarity metrics, it is possible to take account of these disparities and to offer a quality index that is appropriate for numerous 3D inference methods.

Thus, by way of example, the plurality of similarity metrics may be selected from:
- an L-1 or an L-2 norm evaluated between the pixel values of the 3D inference image and the pixel values of the corresponding original image;
- a scalar product evaluated between a matrix representing the pixel values of the 3D inference image and a matrix representing the pixel values of the corresponding original image;
- a generalized Jaccard index evaluated between a set formed by the pixel values of the 3D inference image and a set formed by the pixel values of the corresponding original image;
- a statistical correlation evaluated between the pixel values of the 3D inference image and the pixel values of the corresponding original image;
- mutual information evaluated between the pixel values of the 3D inference image and the pixel values of the corresponding original image; and
- a structural similarity index evaluated between the pixel values of the 3D inference image and the pixel values of the corresponding original image.

Naturally, this list is not exhaustive and other similarity metrics may be considered.

In a particular implementation, the digital model used in the invention is a linear function of the plurality of similarity metrics.

In other words, the estimated quality index is a weighted combination of similarity metrics calculated between the original first image and the second 3D inference image. Such a model is particularly simple, and enables the quality index to be calculated quickly. It is also easy to construct.

During the determination step, the regression technique that is used may rely on a lasso method, for example.

Such a method is itself known. By way of example, it is described in the document by R. Tibshirani entitled "Regression shrinkage and selection via the lasso", Journal of the Royal Statistical Society Series B, 58 (1), pp 267-288, 1996, and comprises least squares minimization under constraints with penalties.

The lasso method is particularly appropriate when attempting to explain a variable (specifically the quality index of the 3D inference image) in linear manner on the basis of a plurality of potentially explanatory variables (specifically the similarity metrics between the original image and the 3D inference image under consideration). It makes it possible to take a plurality of similarity metrics into consideration without needing a priori knowledge about the pertinence of those metrics. Specifically, the lasso method makes it possible to eliminate metrics that are not useful since they have little influence on the quality index.

Naturally, it is possible to envisage other digital models, e.g. that are more complex than a linear model, and also to envisage other regression methods.

As mentioned above, depending on the nature of the 3D information represented in the 3D inference images (depths or orientations of normal vectors), certain quality indices may be more pertinent than others.

In a particular implementation, the second 3D inference image is representative of a depth map and the digital model defines a quality index corresponding to a percentage of pixels of the 3D inference image having values presenting a logarithmic or relative difference relative to measured values of the 3D information represented by those pixels that is less than a first predetermined threshold.

By way of example, the first threshold is equal to 0.1 (i.e. an error of 10% on the estimated relative or order of magnitude depth).

In another implementation, the second 3D inference image is representative of an orientation map and the digital model defines a quality index corresponding to a percentage of pixels of the 3D inference image having values presenting a mean difference or a median relative to measured values of the 3D information represented by those pixels that is less than a second predetermined threshold.

By way of example, the second threshold may be equal to 30°.

Naturally, quality indices other than the above-mentioned indices may be envisaged for constructing the digital model. Nevertheless, the two above-specified quality indices have been identified by the inventors as being pertinent for a large number of 3D inference methods and therefore make it possible to obtain a quality index that is appropriate for a plurality of 3D inference methods. Specifically, taking account of a logarithmic or relative difference makes it possible to distinguish better between a good 3D inference and a poor 3D inference over the set of image pixels. Also, taking percentages of "good" pixels into consideration as quality indices is more robust against the noise contained in the observations used, since that represents the best fraction of pixels that are valid relative to a threshold. The threshold is adjusted to manage the level of noise that can be tolerated by the quality index. The proposed thresholds of 0.1 and 30° are preferred values that have been determined experimentally by the inventors and that are good for handling the level of noise contained in the observations in the databases.

In a particular implementation, all or some of the steps of the navigation assistance method are determined by computer program instructions.

Consequently, the invention also provides a computer program on a data medium, the program being suitable for being performed in a system for assisting driving or more generally in a computer, the program including instructions adapted to performing steps of driving assistance method as described above.

The program may use any programming language, and it may be in the form of source code, object code, or code intermediate between source code and object code, such as in a partially compiled form, or in any other desirable form.

The invention also provides a computer readable data medium, including instructions of a computer program as mentioned above.

The data medium may be any entity or device capable of storing the program. For example, the medium may comprise storage means such as a read only memory (ROM), for example a compact disk (CD) ROM or a microelectronic circuit ROM, or indeed magnetic recording means, e.g. a hard disk.

Furthermore, the data medium may be a transmissible medium such as an electrical or optical signal that can be conveyed via an electrical or optical cable, by radio, or by other means. The program of the invention may in particular the downloaded from a network of the Internet type.

Alternatively, the data medium may be an integrated circuit in which the program is incorporated, the circuit being adapted to execute or to be used in the execution of the method in question.

BRIEF DESCRIPTION OF THE DRAWINGS

Other characteristics and advantages of the present invention appear from the following description made with reference to the accompanying drawings, which show an implementation having no limiting character. In the figures:

FIGS. 1A, 1B, and 1C, described above, show an example of a color image (FIG. 1A) and of 3D inference images generated from that color image (depth map shown in FIG. 1B and orientation map shown in FIG. 1C);

FIG. 2 show, a driving assistance system in accordance with a particular embodiment of the invention;

FIG. 3 show, an example of hardware architecture for an evaluation device for evaluating the quality of a 3D inference image and forming part of the FIG. 2 driving assistance system.

DETAILED DESCRIPTION OF THE INVENTION

Figure 4:
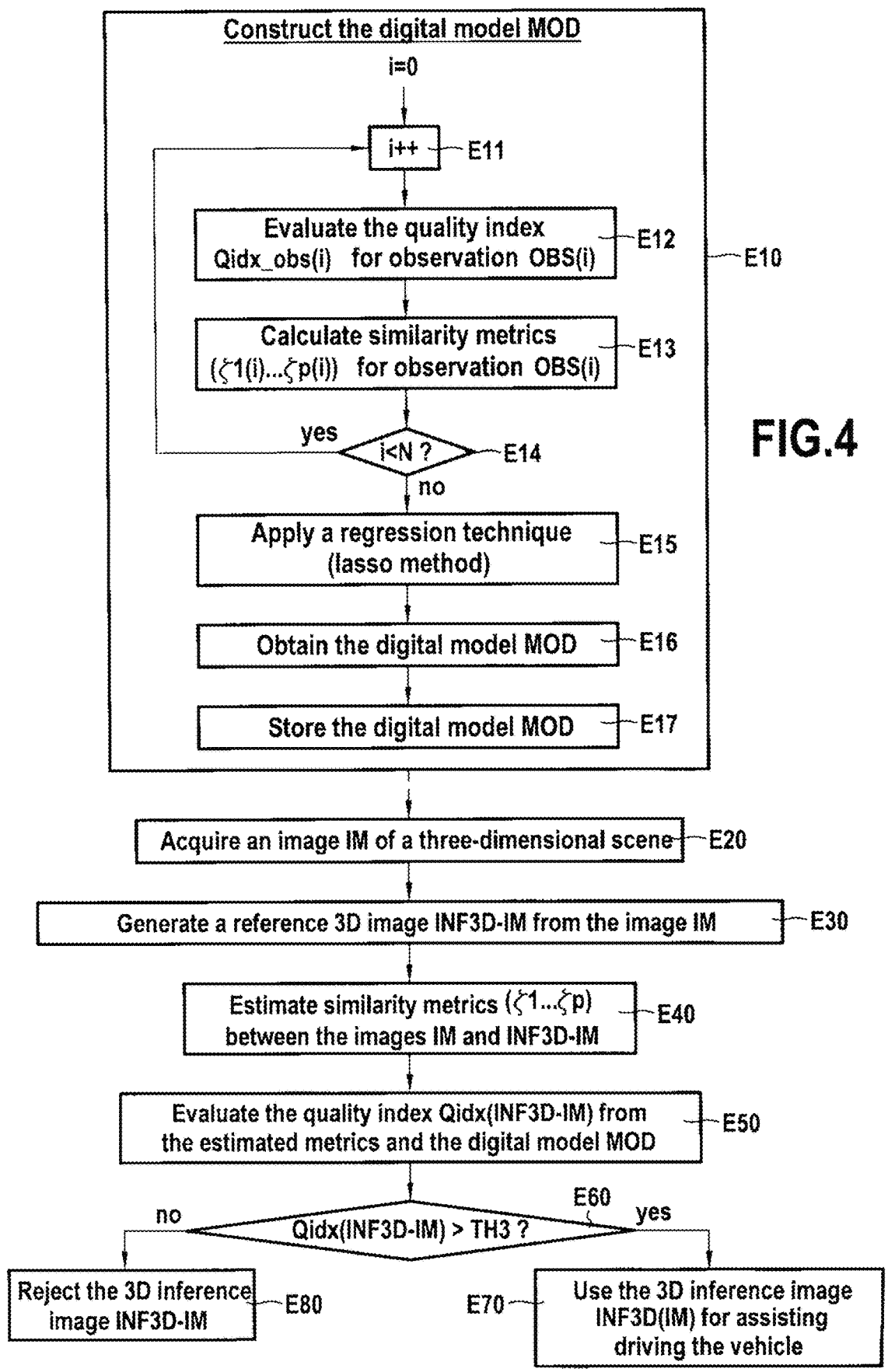
FIG. 4 is, in the form of a flowchart, showing the main steps of a driving assistance method in accordance with a particular implementation of the invention in which the method is performed by the driving assistance system shown in FIG. 2.

FIG. 2 shows, in its environment, a particular embodiment of a system 1 in accordance with the invention for assisting driving a vehicle (not shown).

By way of example, the driving assistance system 1 is on board the vehicle. By way of example, it may be configured to enable the vehicle to avoid obstacles and/or collisions. No limitation is associated with the nature of the vehicle in question, it may equally well be an aerial vehicle (e.g. an airplane), or a land vehicle, or a watercraft, etc.

The driving assistance system 1 incorporates all of the characteristics of a conventional driving assistance system (e.g. a global positioning system (GPS) etc.). While assisting driving the vehicle, it is also configured to make use of images of three-dimensional scenes in the neighborhood of the vehicle and that might have an influence on the driving of the vehicle, together with various items of information that can be extracted from those images.

For this purpose, the driving assistance system 1 comprises:

an image acquisition device 2, e.g. a still or motion picture camera, suitable for acquiring images of three-dimensional scenes that might have an influence on the driving of the vehicle. In the presently described example, the acquired images are red green blue (RGB) color images. In a variant, it is possible to envisage using a device for acquiring images in the infrared or that are grayscale coded; and a 3D inference device 3 suitable for responding to the original images supplied by the image acquisition device 2 to generate 3D inference images representing the 3D information contained in the original images.

It should be observed that no limitation is associated with the 3D inference method used by the device 3: it could equally well be a method based on geometrical and volume constraints, a method based on semantic analyses, or a method by training. Likewise, no limitation is associated with the nature of the 3D inference image generated by the device 3: it may be a depth map or an orientation map.

Nevertheless, the following assumptions are made about the original image and about the corresponding 3D inference image supplied by the device 3:

changes of color and of luminance in the original RGB color image relate to changes of depth and to changes of orientation of the surfaces in the scene shown by the original image;

the original image and the 3D inference image generated on the basis of that image are in register with each other (image pixels correspond);

the sizes of objects in the original image as measured in pixels are the same as the sizes of objects in the generated 3D inference image, likewise as measured in pixels; and the properties of the spatial envelope of the scene (e.g. openness and expansion of the boundaries of the scene, roughness, etc.), are similar in the original image and in the 3D inference image.

Advantageously, the driving assistance system 1 of the invention is configured to evaluate (and to use) the quality of the 3D inference images generated by the 3D inference device 3 from the original images supplied thereto. To do this, the driving assistance system 1 includes an evaluation device 4 for evaluating the quality of the 3D inference images generated by the 3D inference device 3, which evaluation device has the hardware architecture of a computer in the presently described embodiment.

More precisely, the evaluation device 4 for evaluating the quality of the 3D inference images comprises in particular, and as shown in FIG. 3, a processor 5, a random access memory (RAM) 6, a ROM 7, a nonvolatile memory 8, and a communication module 9.

The communication module 9 enables the evaluation device 4 to communicate with the other devices of the driving assistance system 1. By way of example, this communication takes place via digital data buses connecting together the devices of the system 1, or via wireless connections (e.g. Bluetooth, etc.). It also enables the driving system to communicate with one or more databases (grouped together under reference 10) that may be external to the driving system and that may be accessible via a telecommunications network, for example. These databases contain terrain observations OBS (real measurements of 3D information obtained in particular by means of sensors) as used by the driving assistance system 1 in accordance with the invention.

The ROM 7 of the evaluation device 4 constitutes a data medium in accordance with the invention that is readable by the processor 5 and that stores a computer program PROG in accordance with the invention including instructions for executing all or some of the steps of the driving assistance method of the invention.

In equivalent manner, in this example the computer program PROG defines software and functional modules that are configured to perform said steps of the driving assistance method of the invention. These functional modules rely on or control the above-mentioned hardware elements 5-9 of the evaluation device. In this example, they comprise in particular (cf. FIG. 1):

- a construction module 4A (or device) for constructing a digital model MOD that defines a quality index of a 3D inference image resulting from applying a 3D inference method to an original image, the digital model being constructed as a function of a plurality of similarity metrics defined between the original image and its 3D inference image. The module 4A is configured to use the 3D information contained in the databases 10, and for this purpose it relies in particular on the communication module 9 of the system 1;
- an estimation module 4B for estimating a plurality of similarity metrics taken into consideration in the digital model MOD for each image supplied by the image acquisition device 2 and the corresponding 3D inference image supplied by the 3D inference device 3; and
- an evaluation module 4C for evaluating the quality index of each 3D inference image supplied by the 3D inference device 3 by making use of the digital model and the plurality of similarity metrics estimated by the module 4B.

The functions of these various modules are described in greater detail below.

The driving assistance system 1 also comprises a driver device 11 configured to make use of the 3D inference images supplied by the 3D inference device 3 in assisting the driving of the vehicle, the images being used as a function of the quality indices estimated for them by the module 4C.

With reference to FIG. 4, there follows a description of the main steps of a method of assisting driving as performed by a particular embodiment of the driving assistance system 1 shown in FIG. 1.

In accordance with the invention, the driving assistance system 1 is remarkable in that it is configured to estimate a quality index for each 3D inference image generated by the 3D inference device 3 from an image acquired by the image acquisition device 2. For this purpose, the evaluation device 4 of the system 1 relies on a digital model MOD constructed during a preliminary step (step E10) from terrain observations OBS contained in the database(s) 10. Nevertheless, should be observed that the digital model MOD is not necessarily constant and that it may be updated over time, e.g. when the databases 10 are provided with other observations.

By way of example, the databases 10 may be databases that are accessible to the public and that are provided with data from various terrain observations measured by using depth sensors on indoor and/or outdoor scenes, e.g. sensors of the laser or Kinect type. By way of example, and in nonexhaustive manner, such databases may be the following known databases: Make3D, MSR-V3D, KITTI, NYUDepth v1 and v2, SUN RGB-D, B3DO, RMRC 2013 and 2014, etc.

They comprise a plurality of "reference" images of three-dimensional scenes acquired in various different contexts (not necessarily associated with the context surrounding the vehicle for which driving is being assisted by the driving assistance system 1), of "reference" 3D inference images generated from the reference images (it matters little what 3D inference method is used), and also the corresponding 3D information (e.g. depths and orientations of normal vectors measured on all or some of the pixels of the images) as actually measured on the terrain and corresponding to the information represented in the reference 3D inference images.

The digital model MOD constructed by the evaluation device 4, and more particularly by its construction module 4A, defines a quality index, written Qidx, for a 3D inference image resulting from applying a 3D inference method (without limitation on the 3D inference method under consideration) to an original image as a function of a plurality of similarity metrics, written ($\xi 1, \ldots, \xi p$) defined between the original image and the associated 3D inference image, where p designates an integer greater than 1.

In the presently described implementation, consideration is given to two distinct quality indices (and thus to two distinct digital models) depending on whether the 3D inference image is a depth map or an orientation map. More precisely:

- if the 3D inference image is representative of a depth map: the digital model MOD is a model MOD$^{(D)}$ defining a quality index Qidx$^{(D)}$ corresponding to a percentage of pixels in the 3D inference image that have values presenting a logarithmic or relative difference below a first predetermined threshold TH1 relative to measured values of the 3D information represented by those pixels;
- if the 3D inference image is representative of an orientation map: the digital model MOD is a model MOD$^{(N)}$ defining a quality index Qidx$^{(N)}$ corresponding to a percentage of pixels in the 3D inference image that have values presenting a standard deviation or a median value below a second predetermined threshold relative to measured values of the 3D information represented by those pixels.

Below, for simplification purposes, the superscripts $^{(D)}$ and $^{(N)}$ for specifying which digital model is constructed and the quality index defined by that digital model are omitted, since the ways in which both of the models MOD$^{(D)}$ et MOD$^{(N)}$ are constructed are identical, apart from the ways in which the corresponding quality indices are defined.

In the presently described implementation, the p similarity metrics ($\xi 1, \ldots, \xi p$) used for defining the quality index are selected from:

- an L-1 or L-2 norm evaluated between the pixel values of the 3D inference image (e.g. written D) and the pixel values of the original image (e.g. written D$^{IM}$) such as, for example:

$$\xi = \sum_{p=1}^{N} |d_p - d_p^{IM}| (L-1 \text{ norm}) \text{ or}$$

$$\xi = \sum_{p=1}^{N} |d_p - d_p^{IM}|^2 (L-2 \text{ norm})$$

where N specifies the number of pixels of the 3D inference image D, $d_p$ the value of the pixel p in the 3D inference image $D^{IM}$, and $d_p^{IM}$ the value of the pixel p in the original image;

- a scalar product evaluated between a matrix representing the values of the pixels of the 3D inference image and a matrix representing the values of the pixels of the original image;
- a generalized Jaccard index evaluated between a set formed by the pixel values of the 3D inference image $D^{IM}$ and a set formed by the pixel values of the original image D. In known manner, the Jaccard index $J(D, D^{IM})$ between two sets A and B is defined by:

$$J(D, D^{IM}) = \frac{|D \cap D^{IM}|}{|D \cup D^{IM}|}$$

- a statistical correlation evaluated between the pixel values of the 3D inference image $D^{IM}$ and the pixel values of the original image D. In known manner, the correlation between two sets of values corresponding respectively to the images D and $D^{IM}$ is defined by:

$$\rho(D, D^{IM}) = \frac{\text{cov}(D, D^{IM})}{\sigma_D \sigma_{D^{IM}}}$$

where cov designates covariance and σ standard deviation;
- mutual information evaluated between the pixel values of the 3D inference image and the pixel values of the original image. By way of example, a definition of mutual information is given at the site https://en.wikipedia.org/wiki/Mutual_information; and
- a structural similarity index evaluated between the pixel values of the 3D inference image and the pixel values of the original image. By way of example, one way of calculating such a structural similarity index is described at the site https://en.wikipedia.org/wiki/Structural_similarity.

Naturally, this list is not exhaustive and other similarity metrics may be used, e.g. such as a similarity metric based on a GIST descriptor or derived from granulometric analysis of images.

Furthermore, in the presently described implementation, the digital model MOD defines the quality index Qidx as a weighted combination of similarity metrics (ξ1, . . . , ξp). More precisely, the digital model MOD is a linear function given by:

MOD: Qidx=β0+[1 2 . . . p]$^T$·[β1 β2 . . . βp]

where β0 is a constant, β1, β2, . . . , βp are coefficients (e.g. reals) for weighting similarity metrics, and $^T$ designates the transposition operator.

In order to estimate the constant β0 and the weighting coefficients β1, β2, . . . , βp, the construction module 4A uses each observation OBS(i) (i an integer greater than 1) available in the database 10 and pertinent for constructing the digital model MOD (step E11), in order to calculate the quality index Qidx_obs(i) observed for the 3D inference image (step E12). In this example, each observation OBS(i) comprises a reference 3D inference image INF3D(i) generated from a reference original image I(i) (it matters little which inference method is used) and from real measurements OBS3D(i) (i.e. values measured by means of sensors, for example) of all or some of the 3D information represented on the pixels of the reference 3D inference image. Naturally, account is taken only of observations that are pertinent for the looked-for digital model (i.e. MOD$^{(D)}$ or MOD$^{(N)}$), i.e. only observations representing depth maps if MOD=MOD$^{(D)}$ or only observations representing orientation maps if MOD=MOD$^{(N)}$.

As mentioned above, if the 3D inference image INF3D(i) represents a depth map, the calculated observed quality index Qidx_obs(i) is then a percentage of pixels of the 3D inference image INF3D(i) having values presenting a mean relative or logarithmic difference δ1 less than the first predetermined threshold TH1 relative to the values OBS3D(i) measured for the pixels.

Thus, by way of example, the construction module 4A may consider the difference δ1 to be the mean relative difference defined from an L-1 norm (a norm defined from an absolute value) by:

$$\delta 1 = \frac{1}{N} \sum_{p=1}^{N} \frac{|d_p - d_p^*|}{d_p^*}$$

where N designates the number of pixels in the 3D inference image INF3D(i), $d_p$ designates the depth associated with the pixel p in the 3D inference image INF3D(i), and $d_p^*$ designates the depth measured on the terrain corresponding to the pixel p as extracted from the measurements OBS3D(i).

In another example, the construction module 4A may consider the difference δ1 to be the mean relative difference defined from an L-2 norm (squared norm) by:

$$\delta 1 = \frac{1}{N} \sum_{p=1}^{N} \frac{(d_p - d_p^*)^2}{d_p^*}$$

In yet another example, the construction module 4A may consider the difference δ1 to be the mean relative logarithmic difference defined by:

$$\delta 1 = \frac{1}{N} \sum_{p=1}^{N} (\log_{10}(d_p) - \log_{10}(d_p^*))$$

In the presently described implementation, the first threshold TH1 is preferably selected to be equal to 0.1. This threshold of 0.1 is equivalent to a relative or order of magnitude error of 10% on the estimate made by the 3D inference method, in other words, for an estimated depth of 1 meter (m), the number of pixels differing by +0.1 m is measured.

If, in contrast, the 3D inference image INF3D(i) represents an orientation map, the calculated observed quality index Qidx_obs(i) is a percentage of pixels of the 3D inference image INF3D(i) having values presenting a mean difference or a median value δ2 less than a second predetermined threshold TH2 relative to the values OBS3D(i) measured for the pixels.

Thus, by way of example, the construction module 4A may consider the difference δ2 to be the mean difference defined by:

$$\delta 2 = \frac{1}{N} \sum_{p=1}^{N} \theta_p$$

where $\theta_p$ designates the angle between the vector that is normal to the pixel p of the 3D inference image INF3D(i) and the normal vector as measured on the scene and corresponding to that pixel.

In another example, the construction module 4A may consider the difference $\delta 2$ to be the median value of the set constituted by the angles $(\theta_1, \theta_2, \ldots, \theta_N)$.

In the presently described implementation, the threshold TH2 is preferably selected to be equal to 30°. Specifically, the inventors have observed that this threshold TH2, like the above defined threshold TH1 of 0.1, serves to take account of the level of noise that generally affects the observations OBS(i) in the database 10.

Naturally, quality indices other than percentages of "good pixels" or other differences could be taken into consideration for performing the invention. For example, for the difference $\delta 1$, it is possible to envisage using a linear or logarithmic root mean square error (rmse) as defined by:

$$\delta 1 = \sqrt{\frac{1}{N} \sum_{p=1}^{N} (d_p - d_p^*)^2} \quad \text{or}$$

$$\delta 1 = \sqrt{\frac{1}{N} \sum_{p=1}^{N} (\log_{10}(d_p) - \log_{10}(d_p^*))^2}$$

Nevertheless, the inventors have observed that relative similarity metrics tend to penalize more severely 3D inference images presenting differences relative to the measured values for shallow depths. In contrast, rmse type metrics penalize more severely 3D inference images that present differences relative to the measured values for greater depths. Logarithmic metrics (in particular metrics based on base 10 logarithms $\log_{10}$) penalize 3D inference images as a function of the orders of amplitude of the depths. Such logarithmic similarity metrics thus constitute a better quality indicator of 3D inference images for overall evaluation over all of the depths in the three-dimensional scene under consideration.

Likewise, it is possible to envisage other values for the thresholds TH1 and TH2, such as for example: TH2=11.25° or 22.5°. As mentioned above, these threshold values serve to take account of the noise affecting the reference databases used for constructing the digital model MOD. Specifically, mean metrics are relatively sensitive to the quality of the training measurements used. They rely on the assumption of the measurements being of relatively high quality: data that is without noise, that is dense, that is accurate, with no missing data, images having the same resolution, etc.

Unfortunately, the databases available for constructing the digital model generally do not satisfy all of those constraints: terrain measurements contained in databases (e.g. measured depths) are often acquired by using noisy depth sensors (e.g. sensors of the Kinect type), and are not always at the hoped-for density (e.g. a cloud of points scanned by a laser).

For each observation OBS(i) that is pertinent for constructing the digital model MOD, the construction module 4A also evaluates the observed values of the similarity metrics ($\xi 1, \ldots, \xi p$) relative to the observation (step E13), written ($\xi 1 obs(i), \ldots, \xi pobs(i)$) below. For this purpose, uses the pixel values of the reference inference image INF3D(i) and the pixel values of the corresponding reference original image I(i).

The construction module 4A evaluates the observed quality indices and the observed values of the similarity metrics for each observation OBS(i) available in the database 10. It is assumed that N observations are available, i.e. i=1, ..., N (cf. incrementation step E11 and test step E14).

Thereafter, the construction module 4A uses the observed quality indices Qidx_obs(i) and the observed values for the similarity metrics ($\xi 1 obs(i), \ldots, \xi pobs(i)$) as calculated for all of the observations OBS(i), i=1, ..., N in order to determine the digital model MOD.

For this purpose, it applies a regression technique on the observed values for the quality indices and for the calculated similarity metrics (step E15).

In the presently described implementation, the technique that is applied is the lasso method. By way of example, this method is described in detail in the document by R. Tibshirani entitled "Regression shrinkage and selection via the lasso", Journal of the Royal Statistical Society Series B, 58 (1), pp 267-288, 1996. It relies on least squares minimization under constraints with penalties.

More particularly in this implementation, the lasso technique consists in minimizing a sum of errors squared under constraint, said constraint relating to an L-1 norm defined on the coefficients $\beta 1, \beta 2, \ldots, \beta p$. In the presently described implementation, the lasso technique is thus used in order to estimate the variables $\beta 0, \beta 1, \beta 2, \ldots, \beta p$ that satisfy:

$$(\hat{\beta}0, \hat{\beta}1, \hat{\beta}2, \ldots, \hat{\beta}p) =$$

$$\operatorname{argmin} \left\{ \frac{1}{2N} \sum_{i=1}^{N} \left( \text{Qidx\_obs}(i) - \beta 0 - \sum_{j=1}^{p} \beta j \cdot \text{jobs}(i) \right)^2 + \lambda \sum_{j=1}^{p} |\beta j| \right\}$$

where ($\hat{\beta}0, \hat{\beta}1, \hat{\beta}2, \ldots, \hat{\beta}p$) designate the estimated variables, N the number of observations under consideration, and $\lambda$ is a positive real regularization parameter. The value of the $\lambda$ may be selected in arbitrary manner. Nevertheless, the smaller the value selected for $\lambda$, the greater the number of similarity metrics that are selected by the lasso method.

It should be observed that advantageously, the lasso technique makes it possible to eliminate redundant similarity metrics. In other words, for such metrics, the coefficient $\hat{\beta}$ as estimated by the lasso method is zero. Also, because during minimization account is taken of a constraint established on the norm of the coefficients $\beta 1, \beta 2, \ldots, \beta p$, it is ensured that $|\hat{\beta}j|, j=1, \ldots, p$ reflects the power of each similarity metric $\xi j$ when calculating the quality index.

After applying the lasso technique, the construction module 4A possesses a digital model MOD for the quality index given by (step E16):

MOD: Qidx=$\beta 0$+[1 2 ... $p$]$^T$·[$\hat{\beta}1$ $\hat{\beta}2$ ... $\hat{\beta}p$]

or in equivalent manner:

$$\text{MOD: } Qidx = \beta 0 + \sum_{j=1}^{p} \hat{\beta} j \cdot j$$

The digital model MOD is then stored by the construction module 4A in the nonvolatile memory 8 of the evaluation device 4 (step E17).

It should be observed that the invention is limited neither to a digital model that is linear, nor to using a lasso method for determining the digital model. It is possible to envisage using digital models that are more complex (e.g. quadratic or polynomial) and also other optimization methods, such as for example other robust regression methods, e.g. the methods known as: M-estimators, least trimmed squares (LTS), Ridge regression, elastic net, Bayesian regulation, etc.

In accordance with the invention, the digital model MOD can then be used to evaluate the quality of a 3D inference image generated from an original image, independently of the 3D inference method that was used. It should be observed that the digital model MOD may be constructed at any moment prior to evaluating the quality of the image, typically during a preliminary stage that is not correlated with its use, and potentially a long way upstream from such use.

It should also be observed that the digital model MOD may either be a digital model that is adapted to 3D inference images of the depth map type or else a digital model that is adapted to 3D inference images of the orientation map type. If the driving system is to process both types of image, then the construction module 4A constructs a distinct digital model for each type of image and stores each of them in the nonvolatile memory 8.

In order to illustrate the use of the digital model MOD by the driving system 1, it is assumed below that the system 1 uses its acquisition device 2 to acquire an image IM of a three-dimensional scene that might have an influence on the driving of the vehicle with which it is associated (step E20). As mentioned above, in this example the image IM is an RGB color image. It is a "first" image in the meaning of the invention.

This image IM is supplied by the acquisition device 2 to the 3D inference device 3. The 3D inference device 3 applies a 3D inference method to the image IM in order to extract the 3D information contained in the image IM and generate a 3D inference image INF3D-IM (a "second" image in the meaning of the invention) (step E30).

No limitation is associated with the 3D inference method used by the device 3 for generating the 3D inference image INF3D-IM (methods based on geometrical and/or volume constraints, methods based on semantic constraints, methods by training, etc.). Furthermore, nor is any limitation associated with the form of the 3D inference image INF3D-IM: it may thus equally well be a depth map or an orientation map.

Thereafter, the evaluation device 4 of the driving assistance system 1 uses the images IM and INF3D-IM (and the values of their pixels) to estimate each of the similarity metrics $\xi_j$, j=1, . . . , p (step E40). This obtains the estimated metrics $\xi estj$, j=1, . . . , p.

The evaluation device 4 evaluates the quality index Qidx (INF3D-IM) of the 3D inference image INF3D-IM by putting the similarity metrics $\xi estj$, j=1, . . . , p as estimated in this way to the digital model MOD (step E50). More precisely, if the 3D inference image INF3D-IM is a depth map, it puts these metrics into the model $MOD^{(D)}$ corresponding to a depth map, or else the 3D inference image INF3D-IM is an orientation map, and it puts these metrics into the model $MOD^{(N)}$ corresponding to an orientation map. Thereafter, the quality index Qidx(INF3D-IM) is supplied to the driver device 11 of the system 1, which uses this index to estimate whether the quality of the image INF3D-IM is sufficient to be used in driving the vehicle. For this purpose, the driver device 11 may for example compare the value of the quality index Qidx(INF3D-IM) with a reference threshold TH3 (test step E60). The reference threshold TH3 may be determined experimentally so as to ensure that the 3D inference image is of sufficient quality to be able to take advantage of information contained in that image while assisting in the driving of the vehicle.

If the quality index Qidx(INF3D-IM) is greater than the reference threshold TH3 (response "yes" to test step E60), then the quality of the 3D inference image is considered as being satisfactory, and the 3D inference image INF3D-IM is used by the driver device 11 for assisting driving the vehicle (step E70).

For example, the device 11 may use this image to avoid obstacles as described in the document by J. Michels et al. entitled "High speed Obstacle Avoidance using Monocular Vision", Proceedings of the $22^{nd}$ International Conference on Machine Learning, 2005, or for detecting objects on the path of the vehicle as described in the document by X. Chen et al. entitled "Monocular 3D Object Detection for Autonomous Driving", International Conference on Computer Vision (ICCV), 2015.

Otherwise (response "no" to test step E60), the quality of the 3D inference image is considered as being insufficient, and it is not used by the driver device 11 to assist in driving the vehicle (step E80).

It should be observed that the invention is described with reference to a system for assisting driving a vehicle. Nevertheless, the quality index that is determined by the invention can be used in other contexts in which 3D inference images are generated and used, such as for example in a video surveillance system.

The invention claimed is:

1. A method of assisting driving a vehicle, the method comprising:
    constructing a digital model defining a quality index for a three dimensional (3D) inference image resulting from applying a first 3D inference method of a plurality of 3D inference methods to an original image as a function of a plurality of similarity metrics defined between the original image and the 3D inference image, said constructing using a set of observations obtained for a plurality of reference 3D inference images resulting from applying at least one 3D inference method of the plurality of 3D inference methods to a plurality of reference original images, said observations comprising measured values for 3D information represented on the reference 3D inference images;
    acquiring a first image of a three-dimensional scene that might have an influence on the driving of the vehicle;
    generating, using the first image, a second 3D inference image by applying the first 3D inference method or a second 3D inference method of the plurality of 3D inference methods to the first image;
    estimating said plurality of similarity metrics between said first image and said second 3D inference image;
    evaluating the quality index of the second 3D inference image by using the digital model and said plurality of estimated similarity metrics; and
    as a function of the quality index as estimated, using the second 3D inference image to assist driving the vehicle,
    wherein the constructing the digital model comprises:
        evaluating, for each of the observations:
            the quality index defined by the digital model by using the pixel values of the reference 3D inference images and the measured values of the 3D information represented by those pixels, and the plurality of similarity metrics by using the pixel values of the reference 3D inference images and the pixel values of the corresponding reference original images, and determining the digital model by applying a regression technique to the quality indices and the similarity metrics evaluated during the evaluating.

2. The method according to claim 1, wherein the digital model is a linear function of the plurality of similarity metrics.

3. The method according to claim 1, wherein the regression technique relies on a lasso method.

4. The method according to claim 1, wherein the second 3D inference image is representative of a depth map and the digital model defines a quality index corresponding to a percentage of pixels of the 3D inference image having values presenting a logarithmic or relative difference relative to measured values of the 3D information represented by those pixels that is less than a first predetermined threshold.

5. The method according to claim 4, wherein the first threshold is equal to 0.1.

6. The method according to claim 1, wherein the second 3D inference image is representative of an orientation map and the digital model defines a quality index corresponding to a percentage of pixels of the 3D inference image having values presenting a mean difference or a median value relative to measured values of the 3D information represented by those pixels that is less than a second predetermined threshold.

7. The method according to claim 6, wherein said second threshold is equal to 30°.

8. The method according to claim 1, wherein said plurality of similarity metrics is selected from:
   an L-1 or an L-2 norm evaluated between the pixel values of the 3D inference image and the pixel values of the corresponding original image;
   a scalar product evaluated between a matrix representing the pixel values of the 3D inference image and a matrix representing the pixel values of the corresponding original image;
   a generalized Jaccard index evaluated between a set formed by the pixel values of the 3D inference image and a set formed by the pixel values of the corresponding original image;
   a statistical correlation evaluated between the pixel values of the 3D inference image and the pixel values of the corresponding original image;
   mutual information evaluated between the pixel values of the 3D inference image and the pixel values of the corresponding original image; and
   a structural similarity index evaluated between the pixel values of the 3D inference image and the pixel values of the corresponding original image.

9. An assistance system for assisting driving a vehicle, the assistance system comprising:
   an evaluation device comprising a processor configured to construct a digital model defining a quality index for a three dimensional (3D) inference image resulting from applying a first 3D inference method of a plurality of 3D inference methods to an original image as a function of a plurality of similarity metrics defined between the original image and the 3D inference image, by
   using a set of observations obtained for a plurality of reference 3D inference images resulting from applying at least one 3D inference method of the plurality of 3D inference methods to a plurality of reference original images, said observations comprising measured values for 3D information represented on the reference 3D inference images, evaluating, for each of the observations:
      the quality index defined by the digital model by using the pixel values of the reference 3D inference images and the measured values of the 3D information represented by those pixels, and
      the plurality of similarity metrics by using the pixel values of the reference 3D inference images and the pixel values of the corresponding reference original images, and
   determining the digital model by applying a regression technique to the quality indices and the evaluated similarity metrics;
   an acquisition device configured to acquire a first image of a 3D scene that might have an influence on the driving of the vehicle; and
   a 3D inference device configured to use the first image to generate a second 3D inference image by applying the first 3D inference method or a second 3D inference method of the plurality of 3D inference methods to the first image, wherein
   the processor of the evaluation device is configured to evaluate the quality of the second 3D inference image by:
      estimating said plurality of similarity metrics between said first image and said second 3D inference image, and
      evaluating the quality index of the second 3D inference image by using the digital model and said plurality of estimated similarity metrics, and
   said assistance system is configured to use the second 3D inference image as a function of the estimated quality index.

10. The assistance system according to claim 9, wherein said assistance system is configured to cause the vehicle to avoid obstacles and/or collisions.

* * * * *